United States Patent [19]

Okada et al.

[11] 4,379,879
[45] Apr. 12, 1983

[54] HEAT RESISTANT RESIN COMPOSITION AND INSULATING WIRE USING THE SAME WHICH IS A COMPOSITION OF AN ACTIVE HYDROGEN COMPOUND AND THE REACTION PRODUCT OF A POLYVALENT ISOCYANATE AND A POLYVALENT CARBOXYLIC ACID ANHYDRIDE IN AN ORGANIC SOLVENT

[75] Inventors: Yasunori Okada; Shozo Kasai, both of Hitachi, Japan

[73] Assignee: Hitachi Chemical Co., Ltd., Tokyo, Japan

[21] Appl. No.: 299,110

[22] Filed: Sep. 3, 1981

[30] Foreign Application Priority Data

Jul. 2, 1980 [JP] Japan .................................. 55-91180

[51] Int. Cl.$^3$ ............................................. C08L 79/08
[52] U.S. Cl. ....................................... 524/186; 156/51; 427/388.2; 428/364; 428/423.3; 428/425.8; 524/284; 524/300; 524/389; 524/391; 528/49; 528/73

[58] Field of Search ...................... 528/49, 73; 156/51; 427/388.2; 428/364, 423.3, 425.8; 260/45.85 R, 45.9 R, 45.9 QA, 45.95 P; 524/186, 284, 300, 389, 391

[56] References Cited

U.S. PATENT DOCUMENTS

| | | | |
|---|---|---|---|
| 3,555,113 | 1/1971 | Sattlen | 528/73 |
| 3,701,756 | 10/1972 | Carleton et al. | 528/49 |
| 3,812,082 | 5/1974 | Jones | 528/73 |
| 4,187,365 | 2/1980 | Zecher et al. | 528/49 |

*Primary Examiner*—Maurice J. Welsh
*Attorney, Agent, or Firm*—Antonelli, Terry & Wands

[57] ABSTRACT

A resin composition comprising (A) a reaction product obtained by reacting (a) a polyvalent isocyanate, (b) a polyvalent carboxylic acid anhydride, and if necessary, (c) a polyvalent carboxylic acid, in an organic solvent, and (B) a compound having active hydrogen in the molecule except for a phenolic compound, shows excellent heat resistance and storage stability. Insulated wires obtained by coating said resin composition on an electric conductor directly or indirectly are advantageously produced.

18 Claims, No Drawings

HEAT RESISTANT RESIN COMPOSITION AND INSULATING WIRE USING THE SAME WHICH IS A COMPOSITION OF AN ACTIVE HYDROGEN COMPOUND AND THE REACTION PRODUCT OF A POLYVALENT ISOCYANATE AND A POLYVALENT CARBOXYLIC ACID ANHYDRIDE IN AN ORGANIC SOLVENT

BACKGROUND OF THE INVENTION

This invention relates to a heat resistant resin composition excellent in heat resistance and storage stability used for supporting films and the like formed articles and to an insulated wire obtained by using said resin composition.

Polyamide-imide resins are well known as being excellent in heat resistance, chemical resistance and mechanical properties and widely used as varnishes for heat resistance wires, varnishes for protecting metal surfaces, films, laminates, adhesives, powder molding materials and the like. Processes for producing polyamide-imide resins are also known (e.g., Japanese Patent Appln. Kokoku (Post-Exam Publn) No. 19274/69). But, resulting resin compositions sometimes increase their viscosities with the lapse of time depending upon production conditions, which results in lowering in so-called storage stability. When a resin composition increases its viscosity with the lapse of time, there arise many inconveniences in that, for example, in the case of using said resin composition as a varnish for protecting metal surfaces, it is necessary to modify coating conditions initially settled, it is necessary to adjust the viscosity of said resin composition having increased viscosity by diluting it with a solvent, and the like and that various properties of the resulting protective coating film obtained by evaporating the solvent are sometimes changed undesirably. Particularly, in the case of applying these resin compositions to circuit boards for electronic parts, changes in viscosity bring about serious problems since very thin films such as those having a few microns in thickness should be formed.

SUMMARY OF THE INVENTION

It is an object of this invention to provide a heat resistant resin composition overcoming the above-mentioned disadvantages and being excellent in storage stability. It is another object of this invention to provide an insulated wire obtained by using said resin composition. Further objects and advantages of this invention will be apparent from the following explanations.

This invention provides a heat resistant resin composition comprising.

(A) a reaction product obtained by reacting,
(a) a polyvalent isocyanate having two or more isocyanate groups in the molecule,
(b) a polyvalent carboxylic acid having one or more acid anhydride group in the molecule or a functional derivative thereof, and, if necessary,
(c) a polyvalent carboxylic acid having two or more carboxyl groups in the molecule or a functional derivative thereof, in an organic solvent, and (B) a compound having one or more active hydrogens in the molecule except for a phenolic compound, said composition being able to be heated or not heated.

This invention also provides an insulated wire obtained by applying said resin composition directly to an electric conductor or applying said resin composition via one or more other insulating materials, followed by baking.

DESCRIPTION OF THE PREFERRED EMBODIMENTS

The reaction product (A) is obtained by reacting (a) a polyvalent isocyanate having two or more isocyanate groups in the molecule, (b) a polyvalent carboxylic acid having one or more acid anhydride groups in the molecule or a functional derivative thereof, and, if necessary, (c) a polyvalent carboxylic acid having two or more carboxyl groups in the molecule or a functional derivative thereof, in an organic solvent.

As the polyvalent isocyanates (a) having two or more isocyanate groups in the molecule, there can be used aliphatic, alicyclic, aromatic-aliphatic, aromatic and heterocyclic polyisocyanates. Examples of these polyisocyanates are ethylene diisocyanate, 1,4-tetramethylene diisocyanate, 1,6-hexamethylene diisocyanate, 1,12-dodecane diisocyanate, cyclobutene-1,3-diisocyanate, cyclohexane-1,3 and -1,4-diisocyanates, 1,3- and 1,4-phenylene diisocyanates, 2,4- and 2,6-tolylene diisocyanates and mixtures of these isomers, 2,4'-diphenylmethane diisocyanate, 4,4'-diphenylmethane diisocyanate, 4,4'-diphenylether diisocyanate, xylylene diisocyanate, 1,4-naphthalene diisocyanate, 1,5-naphthalene diisocyanate, and the like. These polyisocyanates can be used alone or as a mixture thereof.

As the polyvalent carboxylic acids (b) having one or more acid anhydride groups in the molecule or functional derivatives thereof, there can be used trimellitic acid anhydride, pyromellitic acid anhydride, benzophenonetetracarboxylic acid anhydride, 1,2,3,4-butanetetracarboxylic acid anhydride, bicyclo-[2,2,2]-oct-(7)-ene-2:3, 5:6-tetracarboxylic acid anhydride, etc. These polyvalent carboxylic acid anhydrides can be used alone or as a mixture thereof.

As the polyvalent carboxylic acids (c) having two or more carboxyl groups in the molecule or functional derivatives thereof, there can be used terephthalic acid, isophthalic acid, phthalic acid, adipic acid, succinic acid, trimesic acid, and the like. These polyvalent carboxylic acids can be used alone or as a mixture thereof.

The term "functional derivatives" of the polyvalent carboxylic acid having one or more acid anhydride groups in the molecule or of the polyvalent carboxylic acid having two or more carboxyl groups in the molecule means monoanhydrides, dianhydrides, esters, amides, chlorides, of these polyvalent carboxylic acids.

As the organic solvent, there can be used N-methyl-2-pyrrolidone, N,N-dimethylacetamide, N,N-dimethylformamide, dimethyl sulfoxide, nitrobenzene, chlorobenzene, N-methyl caprolactam, N-ethyl caprolactam, cresol, phenol, benzene, toluene, xylene, and the like alone or as a mixture thereof.

Considering heat resistance, mechanical properties and chemical properties of the reaction product (A), it is preferable to react 0.6 to 1.1 equivalents of the isocyanate group per equivalent of the total of the carboxyl group and the acid anhydride group, more preferably 0.95 to 1.05 equivalents of the isocyanate group per equivalent of the total of the carboxyl group and the acid anhydride group, that is, substantially equivalent amounts.

The reaction of the above-mentioned components (a), (b) and, if necessary, (c), can be carried out in an organic solvent preferably at a temperature of 30° to 200° C., although not restrictive. Considering the easiness of controlling the reaction, the temperature of 80° to 150° C. is more preferable. The amount of the solvent is preferably 30 to 80% by weight, more preferably 40 to 60% by weight, based on the total weight of the components (a), (b) and (c). The process of the reaction can be detected by measuring, for example, the amount of $CO_2$ by-produced, the viscosity of the reaction solution, the concentration of remaining functional groups (isocyanate, carboxyl, acid anhydride groups) and the reaction product (A) having a desired molecular weight can be obtained by controlling the above-mentioned parameters properly.

The compound (B) having one or more active hydrogens in the molecule except for a phenolic compound means that having one or more hydrogen atoms, which can react with the isocyanate group, in the molecule.

As the compounds having one or more active hydrogens in the molecule except for phenolic compounds, there can be used organic compounds having active hydrogens in the molecule, e.g., amines such as n-propylamine, isopropylamine, n-butylamine, isobutylamine, t-butylamine, n-pentylamine, N-methyl-N-butylamine, diethylenetriamine, aniline, diphenylamine, etc.; alcohols such as methanol, ethanol, n-propanol, isopropanol, n-butanol, isobutanol, t-butanol, methyl Cellosolve, ethyl Cellosolve, methyl carbitol, benzyl alcohol, cyclohexanol, etc.; acids such as formic acid, acetic acid, propionic acid, benzoic acid, etc.; mercaptans such as butyl mercaptan, thiophenol, etc.; acid amides such as acetanilide, acetamide, acrylamide, etc.; imides such as succinimide, maleimide, etc.; imidazoles such as imidazole, 2-ethylimidazole, etc.; ureas such as urea, thiourea, etc.; carbamates such as 2-oxazolidone, phenyl N-phenylcarbamate, etc.; imines such as ethyleneimine, etc.; oximes such as formaldoxime, acetoaldoxime, cyclohexanone oxime, etc.; inorganic compounds having active hydrogens in the molecule, e.g., sulfites such as sodium bisulfite, potassium bisulfite, etc.; lactams such as butyllactam, δ-valerolactam, ε-caprolactam, α-propyl-piperidone-(6), 3-ethylpiperidone-(2), ω-lauryl lactam, etc.; ketoesters such as ethyl acetoacetate, propyl acetoacetate, butyl acetoacetate, etc.; β-diketones such as acetylacetone, etc.; hydroxycarboxylic acids such as lactic acid, malic acid, tartaric acid, salicyclic acid, etc.; ketoalcohols such as diacetone alcohol, etc.; alkanolamines such as monoethanolamine, diethanolamine, triethanolamine, etc.; malonic acid diesters such as dimethyl malonate, diethyl malonate, dipropyl malonate, etc.; hydrocyanic acid, hydrazine, water, and the like. These compounds having active hydrogens in the molecule can be used alone or as a mixture thereof.

Among these compounds having active hydrogens in the molecule, amines, alcohols, and acids are preferable from the viewpoint of easiness in handling, price, effect on storage stability and the like.

It is preferable to add 0.1 to 10% by weight of the compound having active hydrogens in the molecule (B) based on the weight of the reaction product (A). If the amount is less than 0.1% by weight, an effect on improving the storage stability of the resin composition is poor, while if the amount is more than 10% by weight, there sometimes brings about lowering in mechanical properties of the film obtained by removing a solvent.

In the field of polyurethane insulating varnishes, products obtained by blocking the isocyanate group of isocyanate group-containing monomers or isocyanate group-containing compounds having relatively low molecular weights with a phenolic compound such as phenol, cresol, xylenol or the like, are sometimes used as a part of varnish materials. Such materials are commercially available, for example, as Coronate APS, Milionate MS-50 (trade names, manufactured by Nippon Polyurethane Co.). These phenolic compounds belong to the compound having active hydrogen in the molecule. But in this invention, these phenolic compounds are not used, since they have no effect on improving storage stability of the composition of this invention as mentioned in Comparative Examples below.

The compound (B) having active hydrogen in the molecule can be added to the reaction product (A) at a temperature so as to make the viscosity of the resulting varnish very low to make the stirring mixing easy, for example, 20° to 80° C., and the stirring is continued until a sufficiently uniform varnish is obtained at that temperature. In general, in the case of the amines, the storage stability can sufficiently be improved by the above-mentioned method, but in the case of the alcohols, heating at 60° to 120° C. for 3 to 6 hours, with stirring after the addition of the alcohols to the reaction product (A) is necessary to improve the storage stability. This is because since the amines are easily reactive with the isocyanate groups, they react with the terminal isocyanate groups in the polymer even at about 20° to 80° C. to form blocked isocyanates, which results in improving the storage stability, whereas in the case of the alcohols, since they are inferior in the reactivity with the isocyanate groups, the terminal isocyanate groups seem to be blocked only in the case of heating at 60° to 120° C.

Therefore, the conditions for adding the component (B) to the reaction product (A) or conducting heat reaction after the addition cannot be determined simply and should be determined by selecting most suitable conditions for individual component (B) to be used. But, generally speaking, the temperatures of 20° to 150° C. are preferable, and those of 60° to 120° C. are more preferable, while the time of 0.5 to 10 hours is preferable, and that of 3 to 6 hours is more preferable.

It is a surprising thing that the addition of a small amount of the compound having active hydrogen in the molecule except for phenolic compounds (usually the amount of 4% by weight or less based on the reaction product (A) being sufficient) causes a remarkable effect on improving the storage stability. This was not found by a chance but obtained as a result of repeating a number of experiments and considerations.

The heat resistant resin composition of this invention can be applied for producing insulated wires by coating said resin composition directly or indirectly on electric conductors, followed by baking, using conventional methods. When said resin composition is indirectly coated on an electric conductor, there is used another insulating material between the electric conductor and the resin composition layer.

Examples of such an insulating material are general-purpose polyester varnishes, tris(2-hydroxyethyl)isocyanate modified polyester varnishes, polyester-imide varnishes, tris(2-hydroxyethyl) isocyanate modified polyester-imide varnishes, polyurethane varnishes, plain varnishes, polyvinyl formal varnishes, nylon varnishes, and the like as well as varnishes which are used for mainly imparting self-bonding properties to insulated wires such as epoxy series varnishes, thermoplastic polyester series varnishes, polyvinyl butyral series varnishes and the like.

This invention is illustrated by way of the following Examples.

REFERENCE EXAMPLE A

In a 5-liter flask equipped with a thermometer, a stirrer and a nitrogen introducing pipe, 912.6 g of 4,4'-diphenylmethane diisocyanate, 697.4 g of trimellitic acid anhydride and 2415 g of N-methyl-2-pyrrolidone were placed and reacted at 90° C. for 1.5 hours, at 100° C. for 1.5 hours, at 120° C. for 1.5 hours and at 135° C. for 2.5 hours, followed by dillution with 575 g of xylene. The resulting reaction product mixture had a viscosity of 29 poises at an initial stage. When the reaction product mixture was allowed to stand at 23° C. for 1 month, the viscosity became 38 poises, while when allowed to stand at 60° C. for 1 month, the viscosity became 45 poises.

EXAMPLE 1

To 400 g of the reaction product mixture obtained in Reference Example A, 4.2 g of n-butylamine was added and stirred at room temperature for 30 minutes. The resulting composition had a viscosity of 35 poises. When allowed to stand at 23° C. for 1 month, the viscosity became 36 poises; this means there is almost no change in viscosity with the lapse of time.

EXAMPLE 2

To 400 g of the reaction product mixture obtained in Reference Example A, 4.2 g of formic acid was added and stirred at room temperature for 30 minutes. The resulting composition had a viscosity of 29 poises. When allowed to stand at 60° C. for 1 month, the viscosity was maintained at 29 poises without causing viscosity change with the lapse of time.

EXAMPLE 3

To 200 g of the reaction product mixture obtained in Reference Example A, 17.5 g of n-butanol was added and stirred at 110° C. for 4 hours. The resulting composition had a viscosity of 29 poises. When allowed to stand at 23° C. for 1 month, the viscosity was maintained at 29 poises. When allowed to stand at 60° C. for 1 month, the viscosity was also maintained at 29 poises without causing viscosity change with the lapse of time.

REFERENCE EXAMPLE B 4,4'-Diphenylmethane diisocyanate in an amount of 805.2 g, 548.4 g of trimellitic acid anhydride and 46.3 g of adipic acid were reacted in 2100 g of N-methyl-2-pyrrolidone in the same manner as described in Reference Example A, followed by addition of 500 g of xylene to give a reaction product mixture having a viscosity of 27 poises at an initial stage. When this reaction product mixture was allowed to stand at 23° C. for 1 month, the viscosity became 37 poises, while when allowed to stand at 60° C. for 1 month, the viscosity became 42 poises.

EXAMPLE 4

To 500 g of the reaction product mixture obtained in Reference Example B, 3.9 g isopropanol was added and stirred at 100° C. for 5 hours. The resulting composition had a viscosity of 27 poises. When allowed to stand at 23° C. for 1 month, the viscosity was maintained at 27 poises. When allowed to stand at 60° C. for 1 month, the viscosity was also maintained at 27 poises without causing viscosity change with the lapse of time.

EXAMPLE 5

To 2000 g of the reaction product mixture obtained in Reference Example B, 10.5 g of methanol was added and stirred at 90° C. for 6 hours. The resulting composition had a viscosity of 27 poises. When allowed to stand at 23° C. for 1 month, the viscosity was maintained at 27 poises. When allowed to stand at 60° C. for 1 month, the viscosity was also maintained at 27 poises without causing viscosity change with the lapse of time.

COMPARATIVE EXAMPLE 1

To 400 g of the reaction product mixture obtained in Reference Example A, 3.5 g of phenol was added and stirred at 100° C. for 3 hours. The resulting composition had a viscosity of 30 poises. When allowed to stand at 23° C. for 1 month, the viscosity became 42 poises. The effect of improving storage stability was not admitted in the case of adding phenol.

COMPARATIVE EXAMPLE 2

To 400 g of the reaction product mixture obtained in Reference Example A, 5.6 g of meta-cresol was added and stirred at 100° C. for 3 hours. The resulting composition had a viscosity of 31 poises. When allowed to stand at 23° C. for 1 month, the viscosity became 45 poises. The effect of improving storage stability was not admitted in the case of adding meta-cresol.

Enamelled copper wires were obtained by coating the compositions obtained in Examples 3 and 5 on copper wires having a diameter of 1 mm by a conventional method and baking at a furnace temperature of 350° C., and repeating the above-mentioned procedures 7 times. Various properties of the enamelled copper wires were measured and listed in the following table.

TABLE

| Run No. Resin composition | 1 Example 3 | 2 Example 5 |
|---|---|---|
| Coating film thickness (mm) | 0.038 | 0.038 |
| Flexibility: | | |
| Ordinary winding | 1X OK | 1X OK |
| Winding after 20% elongation | 1X OK | 1X OK |
| Breakdown voltage (kV) | 13.1 | 13.2 |
| Wear resistance (Repeated strokes) (load: 600 g) (strokes) | 190 | 130 |
| Cut through temperature (load: 2 kg) (°C.) | 430 | 390 |
| Heat shock (250° C. - 1 hour) | 1X OK | 1X OK |
| Flexibility after aging (200° C. - 6 hours) | 1X OK | 1X OK |

As mentioned above, the resin composition of this invention is excellent in heat resistance and storage stability. Therefore, the resin composition of this invention can widely be used industrially as heat resistant varnishes for electric wires, varnishes for protecting metal surfaces, films, laminates, adhesives, powdered molding materials, and the like.

What is claimed is:

1. A heat resistant resin composition comprising:
   (A) a reaction product obtained by reacting
      (a) a polyvalent isocyanate having two or more isocyanate groups in the molecule,
      (b) a polyvalent carboxylic acid having one or more acid anhydride groups in the molecule or a functional derivative thereof, and, if necessary, (c) A polyvalent carboxylic acid having two or more carboxyl groups in the molecule or a functional derivative thereof,
in an organic solvent, and (B) a compound having one or more active hydrogens in the molecule except for a phenolic compound,
said composition being able to be heated or not heated; and
from 0.1 to 10% by weight of said compound (B), based on the weight of the reaction product (A) being added to reaction product (A) to form said composition.

2. A resin composition according to claim 1, wherein the reaction product (A) is obtained by reacting 0.6 to 1.1 equivalents of the isocyanate group with one equivalent of total of the carboxyl group and the acid anhydride group.

3. A resin composition according to claim 1, wherein the compound (B) is an amine.

4. A resin composition according to claim 1, wherein the compound (B) is an alcohol.

5. A resin composition according to claim 1, wherein the compound (B) is an acid.

6. A resin composition according to claim 1, wherein the compound (B) is used in an amount of 0.1 to 10% by weight based on the weight of the reaction product (A).

7. A resin composition according to claim 1, wherein the polyvalent isocyanate (a) is 4,4'-diphenylmethane diisocyanate, 2,4-tolylene diisocyanate, 2,6-tolylene diisocyanate, mixtures of these isomers, 4,4'-diphenylether diisocyanate, xylylene diisocyanate, 1,6-hexamethylene diisocyanate or a mixture thereof.

8. A resin composition according to claim 1, wherein the polyvalent carboxylic acid (b) is trimellitic acid anhydride, pyromellitic acid anhydride, benzophenonetetracarboxylic acid anhydride, 1,2,3,4-butanetetracarboxylic acid anhydride, or a mixture thereof.

9. A resin composition according to claim 1, wherein the polyvalent carboxylic acid (c) is adipic acid, succinic acid, trimesic acid, terephthalic acid, isophthalic acid, phthalic acid or a mixture thereof.

10. A resin composition according to claim 3, wherein the amine is n-butylamine, n-propylamine, isopropylamine, isobutylamine, t-butylamine or a mixture thereof.

11. A resin composition according to claim 4, wherein the alcohol is n-butanol, isopropanol, methanol, ethanol, n-propanol, isobutanol, t-butanol or a mixture thereof.

12. A resin composition according to claim 5, wherein the acid is formic acid, acetic acid or propionic acid.

13. An insulated wire produced by coating the resin composition of claim 1 on an electric conductor directly or indirectly through other insulating coating which is coated on an electric conductor and baking said resin composition.

14. An insulated wire according to claim 13, wherein the insulating coating is present between the electric conductor and the resin composition.

15. An insulated wire according to claim 13, wherein the resin composition comprises
(A) a reaction product obtained by reacting 4,4'-diphenylmethane diisocyanate, trimellitic acid anhydride, and if necessary, adipic acid in an organic solvent, and
(B) an alcohol, an acid or an amine.

16. A heat resistant resin composition comprising:
(A) a reaction product obtained by reacting
  (a) a polyvalent isocyanate having two or more isocyanate groups in the molecule,
  (b) a polyvalent carboxylic acid having one or more acid anhydride groups in the molecule or a functional derivative thereof, and, if necessary,
  (c) a polyvalent carboxylic acid having two or more carboxyl groups in the molecule or a functional derivative thereof,
  in an oranic solvent, and
(B) n-butylamine, n-propylamine, isopropylamine, isobutylamine, or t-butylamine or a mixture thereof,
said composition being able to be heated or not heated.

17. A heat resistant resin composition comprising:
(A) a reaction product obtained by reacting
  (a) a polyvalent isocyanate having two or more isocyanate groups in the molecule,
  (b) a polyvalent carboxylic acid having one or more acid anhydride groups in the molecule or a functional derivative thereof, and, if necessary,
  (c) a polyvalent carboxylic acid having two or more carboxyl groups in the molecule or a functional derivative thereof,
  in an organic solvent, and
(B) n-butanol, isopropanol, methanol, ethanol, n-propanol, or isobutanol or a mixture thereof,
said composition being able to be heated or not heated.

18. A heat resistant resin composition comprising:
(A) a reaction product obtained by reacting
  (a) a polyvalent isocyanate having two or more isocyanate groups in the molecule,
  (b) a polyvalent carboxylic acid having one or more acid anhydride groups in the molecule or a functional derivative thereof, and, if necessary,
  (c) a polyvalent carboxylic acid having two or more carboxyl groups in the molecule or a functional derivative thereof,
  in an organic solvent, and
(B) acetic acid or propionic acid, or a mixture thereof,
said composition being able to be heated or not heated.

* * * * *